(12) United States Patent
Knodt

(10) Patent No.: US 6,515,684 B1
(45) Date of Patent: Feb. 4, 2003

(54) SYSTEMS AND METHODS FOR REVIEWING IMAGE PROCESSING JOB FEATURES

(75) Inventor: Ruediger W. Knodt, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/501,657

(22) Filed: Feb. 10, 2000

(51) Int. Cl.[7] .................................................. G06F 3/00
(52) U.S. Cl. ........................ 345/777; 345/810; 345/813; 358/1.15
(58) Field of Search .............................. 345/777, 786, 345/810–825, 840; 358/1.15, 1.1

(56) References Cited

U.S. PATENT DOCUMENTS

| | | | | |
|---|---|---|---|---|
| 5,133,048 A | * | 7/1992 | Parsons et al. ............... | 358/1.1 |
| 5,550,559 A | * | 8/1996 | Isensee et al. ............... | 345/684 |
| 5,729,350 A | * | 3/1998 | Ozaki ........................... | 358/296 |
| 5,825,361 A | * | 10/1998 | Rubin et al. ................. | 345/836 |
| 6,295,136 B1 | * | 9/2001 | Ono et al. .................... | 345/839 |

OTHER PUBLICATIONS

Novell's CNE Study Guide IntranetWare/NetWare 4.11, Novell Press, pp. 116–117, 1997.*

* cited by examiner

Primary Examiner—Kristine Kincaid
Assistant Examiner—Sajeda Muhebbullah
(74) Attorney, Agent, or Firm—Oliff & Berridge, PLC

(57) ABSTRACT

For displaying a job feature review summary, a feature table is displayed. Each feature is represented by a terse textual language definition. The current feature values are also displayed with the terse definitions. Optionally, an icon is associated with the terse definition and the current feature values.

15 Claims, 13 Drawing Sheets

| Basic Features | Added Features | Image Quality | Output Format | Job Assembly |
|---|---|---|---|---|
| Color Mode<br>- Auto | 2 Sided Copy<br>- Off | Original Type<br>- Off | Covers<br>- Off | Build Job<br>- Off |
| Copy Output<br>- Off | Image Shift<br>- Off | Lighten/Darken<br>- Off | Inserts ✓<br>- Yes, Imaged, Tray3,<br>A 2nd line of text here | |
| Reduce/Enlarge<br>✓ 98% | Original Input<br>- Off | Sharpness<br>- Off | N-Up<br>- Off | |
| Paper Supply<br>- Tray#1 8.5"x11" | Bound Originals<br>- Off | Image Tone Prese<br>- Off | Transparency Op<br>- Off | |
| | Edge Erase<br>- Off | Color Balance<br>- Off | Booklet Creation<br>- Off | |
| | | Hue<br>- Off | Mirror Image<br>- Off | |
| | | Chroma<br>- Off | Negative Image<br>- Off | |
| | | | Repeat Image<br>- Off | |
| | | | Poster<br>- Off | |
| 410 | 420 | 430 | 440 | 450 |

*FIG. 4*

| Basic Features | Added Features | Image Quality | Output Format ✓ | Job Assembly |
|---|---|---|---|---|
| Color Mode<br>- Auto<br><br>Copy Output<br>- Off<br><br>Reduce/Enlarge<br>✓ 98%<br><br>Paper Supply<br>- Tray#1 8.5"x11" | 2 Sided Copy<br>- Off<br><br>Image Shift<br>- Off<br><br>Original Input<br>- Off<br><br>Bound Originals<br>- Off<br><br>Edge Erase<br>- Off | Original Type<br>- Off<br><br>Lighten/Darken<br>- Off<br><br>Sharpness<br>- Off<br><br>Image Tone Prese<br>- Off<br><br>Color Balance<br>- Off<br><br>Hue<br>- Off<br><br>Chroma<br>- Off | Covers<br>- Off<br><br>Inserts ✓<br>- Yes, Imaged, Tray 3 fed,<br>A second line of text fits here.<br><br>N-Up<br>- Off<br><br>Transparency Options<br>- Off<br><br>Booklet Creation<br>- Off<br><br>Mirror Image<br>- Off<br><br>Negative Image<br>- Off<br><br>Repeat Image<br>- Off<br><br>Poster<br>- Off | |

FIG. 5

| Basic Features | Added Features | Image Quality | Output Format | Job Assembly |
|---|---|---|---|---|
| Color Mode <br> - Auto | 2 Sided Copy <br> - Off | Original Type <br> - Off | Covers <br> - Off | Build Job <br> - Off |
| Copy Output <br> - Off | Image Shift <br> - Off | Lighten/Darken <br> - Off | Inserts ✓ <br> Imaged, Tray 1 <br> Back Cover Imaged | |
| Reduce/Enlarge <br> ✓ 98% | Original Input <br> - Off | Sharpness <br> - Off | N-Up <br> - Off | |
| Paper Supply <br> - Tray#1 8.5"x11" | Bound Originals <br> - Off | Image Tone Prese <br> - Off | Transparency Op <br> - Off | |
| | Edge Erase <br> - Off | Color Balance <br> - Off | Booklet Creation <br> - Off | |
| | | Hue <br> - Off | Mirror Image <br> - Off | |
| | | Chroma <br> - Off | Negative Image <br> - Off | |
| | | | Repeat Image <br> - Off | |
| | | | Poster <br> - Off | |

FIG. 6

SYSTEMS AND METHODS FOR REVIEWING IMAGE PROCESSING JOB FEATURES

BACKGROUND OF THE INVENTION

1. Field of Invention

The invention relates to data processing methods and devices.

2. Description of Related Art

In conventional data processing systems, a user can choose between many functions and, for each function, the user can set a plurality of features. Very often, the number of feature values to be set is more than 30. However, for many reasons, including reducing the physical size of the data processing system, small screens, typically less than ten inches in diagonal, are used. To deal with the resulting constraint, icons that each represent one of the features are displayed on the screen. When a user selects one of the icons, for example through a touch screen, a specific window is opened and the user can set one feature value.

SUMMARY OF THE INVENTION

However, icons may be confusing because the information the icons represent is not always clear. Users, and particularly new users or the casual user, may be unable to properly use the data processing system.

The data processing methods and systems according to this invention provide informative programming review and allow a user to easily find and set the value of a feature that the user wants to review or change before performing a data processing job. The review may be used to save one or more job program and apply any saved job program to subsequent jobs.

The data processing methods and systems according to this invention provide a job review summary that includes, for each displayed feature, a terse textual language definition for each feature and at least one current feature value. When reviewing a data processing job, the user will have the possibility to read the terse definitions and select the feature for which the user wants to modify the current feature value.

In various exemplary embodiments, the job feature summary includes a table in which terse textual language definitions and corresponding current feature values are located.

In other exemplary embodiments, the job feature summary includes a table or list of terse textual language definitions accompanied by the corresponding current feature values.

These and other features and advantages of this invention are described in or are apparent from the following detailed description of the systems and methods according to this invention.

BRIEF DESCRIPTION OF THE DRAWINGS

Various exemplary embodiments of this invention will be described in detail, with reference to the accompanying drawings, wherein:

FIG. 4 shows a first exemplary embodiment of a job feature review summary graphical user interface displayable using any one of the exemplary embodiments of the data processing systems and methods according to this invention;

FIG. 5 shows one exemplary embodiment of an expanded table portion of the first exemplary job feature review summary graphical user interface;

FIG. 6 shows a second exemplary embodiment of the job feature review summary graphical user interface according to this invention;

DETAILED DESCRIPTION OF PREFERRED EMBODIMENTS

Figure 1:
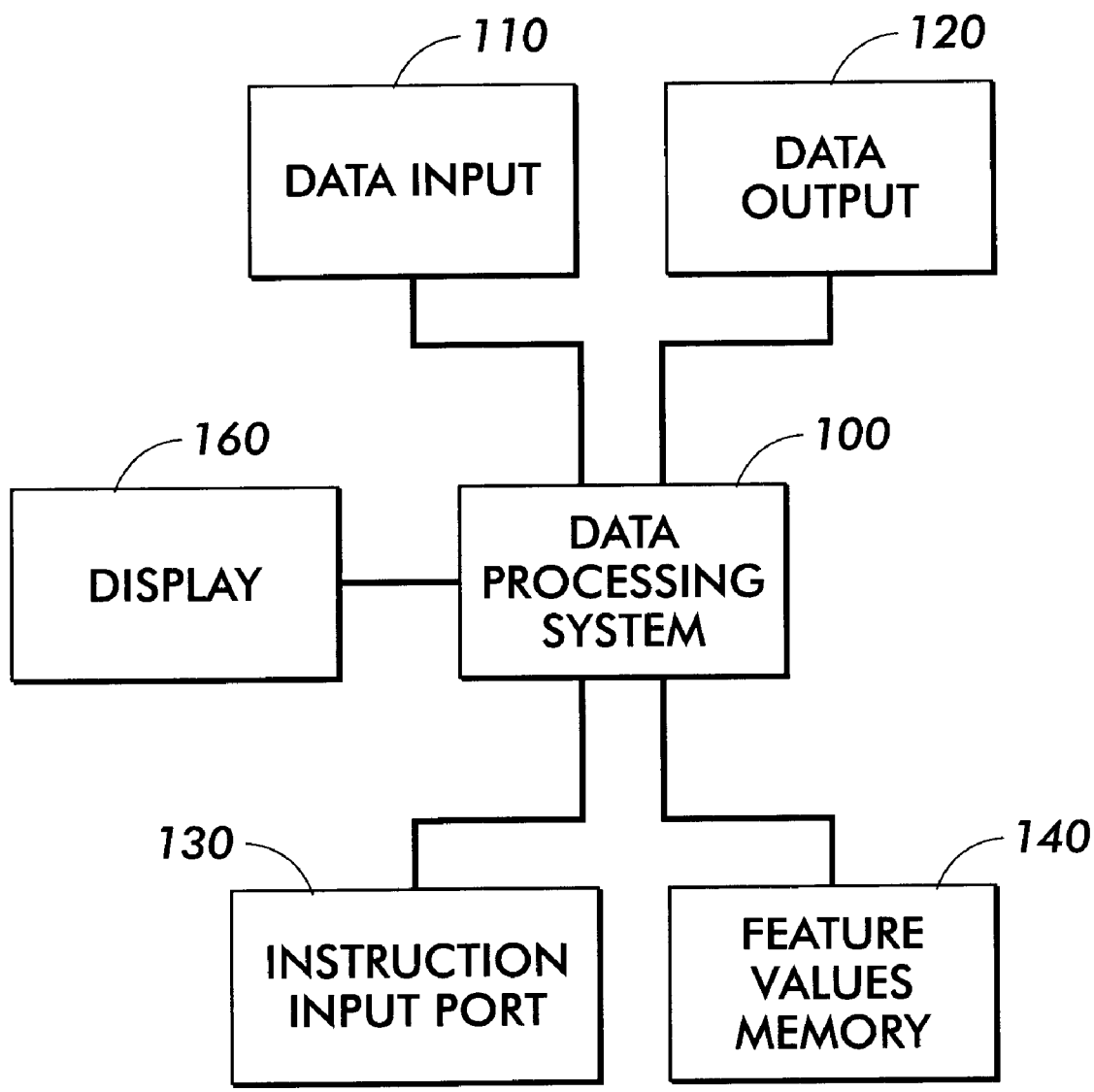
FIG. 1 is a functional block diagram outlining a first exemplary embodiment of a data processing system according to this invention.

FIG. 1 is a functional block diagram outlining a first exemplary embodiment of a data processing system 100 according to this invention. As shown in FIG. 1, the data processing system 100 is connected to a data input circuit 110, a data output circuit 120, an instruction input port 130, a feature value memory 140 and a display 160. The data processing system 100 can be a computer or any other known or later developed system capable of processing data received from the data input circuit 110 and outputting the processed data to the data output circuit 120. The data processing system 100 receives instruction from the instruction input port 130 and stores the selected values for one or more of the image processing feature that are enabled in the data processing system 100 in the feature value memory 140. The data processing device 100 also drives the display 160.

The data input circuit 110 can be connected to one or more of a storage device, such as a hard disk, a compact disk, a diskette, an electronic component, a floppy disk, or any other known or later developed system or device capable of storing data, or a telecommunication network, a digital camera, a scanner, a sensor, a processing circuit, a locally or remotely located computer, or any other known or later developed system capable of generating and/or providing data to the data processing system 100.

The data output circuit 120 can be one or more of a printer, a network interface, a memory, a display circuit, a processing circuit or any known or later developed system capable of handling data.

The instruction input port 130 allows the data processing system 100 to receive inputs from a user to set or change the value for one or more features relating to an image processing job to be performed by the data processing system 100. The instruction input port 130 can be coupled to one or more of a keyboard, a mouse, a touch screen, a touch pad, a microphone, a network, or any other known or later developed device capable of being used to input data. The display 160 is any known or later developed display usable to display data such as an image, symbols, icons, letters or numbers. Using the display 160 and the instruction input port 130, the data processing system 100 allows a user to review and modify current feature values.

In operation, the data processing system 100 receives instructions at the instruction input port 130. The received instructions relate to data processing features to be used to perform data processing jobs on one or more defined sets of data received at the data input circuit 110. For example, a defined set of data can correspond to one or more of an image, a document, a file or a page.

Each feature refers to one or more functions that can be performed by the data processing system 100. For example, one such feature can relate to color processing, another such feature can define a number of copies to be formed by an output device, another such feature defines a reduction/enlargement amount for enlarging or reducing the sizes of an image, another such feature relates to forming a copy using a draft mode of an output device, and so on. The default values and the modified values for the modified ones of these features are stored in the feature value memory 140.

Using the feature values stored in the feature value memory 140 as current feature values, the data processing system 100 processes the data from the data input circuit 110 and output the processed data to the data output circuit 120.

It should be appreciated that the feature value memory 140 can be a portion of a larger memory structure. Moreover, it should be appreciated that the feature value memory 140 can include one or more of a RAM, EPROM, flash memory, EEPROM, diskette, hard disk, compact disk, or any known or later developed type of memory.

Figure 2:
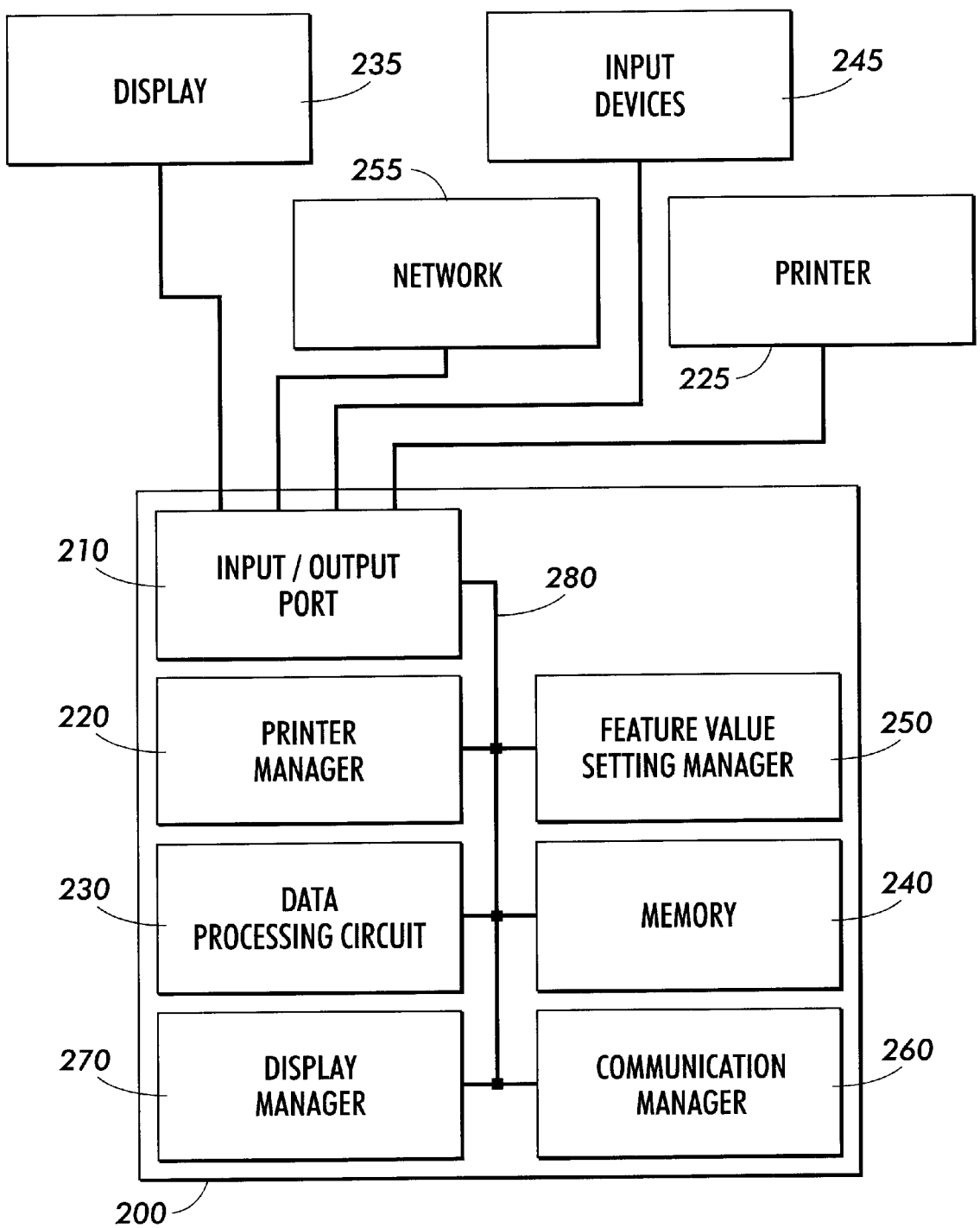
FIG. 2 is a functional block diagram outlining a second exemplary embodiment of a data processing system according to this invention.

FIG. 2 is a functional block diagram outlining a second exemplary embodiment of a data processing system 200 according to this invention. As shown in FIG. 2, the data processing system 200 comprises at least some of an input/output port 210, a printer manager 220, a data processing circuit 230, a memory 240, a feature value setting manager 250, a communication manager 260 and a display manager 270, each connected together by a data/control bus 280.

The input/output port 210 is connected to one or more of a printer 225, a display 235, one or more input devices 245 and/or a network 255. The input/output port 210 receives data from one or more of the one or more input devices 245 and the network 255 and transmits the received data to the data/control bus 280. The input/output port 210 also receives data from the data/control bus 280 and transmits that data to at least one of the printer 225, the display 235, the one or more input devices 245 and the network 255.

The printer manager 220 drives the printer 225. For example, the printer manager 220 can drive the printer 225 to print images, files or documents stored in the memory 240. The input/output port 210 can be connected to one or more of a storage device, such as a hard disk, a compact disk, a diskette, an electronic component, a floppy disk, or any other known or later developed system or device capable of storing data; or a telecommunication network, a digital camera, a scanner, a sensor, a processing circuit, a locally or remotely located computer, or any known or later developed system capable of generating and/or providing data.

The data processing circuit 230 performs data processing jobs on data input from one or more of the one or more input devices 245 and/or the network 255 based on current feature values stored in the memory 240. The memory 240 stores defined feature values for at least a subset of the set of data processing features that can be performed by the data processing circuit 230 and/or the printer 225. The feature value setting manager 250 allows a user to set or modify the current value of data processing features used by the data processing system 200 and/or the printer 225 to process one or more of the defined sets of data received from one or more of the input devices 245 or the network 255.

The communication manager 260 controls the transmission of data to and the reception of data from the network 255. The display manager 270 drives the display 235. A table, having one or more table portions, defining table portions can be displayed on the display 235. Each table portion can include one or more feature terse textual language definitions. The feature value setting manager 250 reads the current feature values corresponding to the displayed feature terse definitions from the memory 240. The display manager 270 drives the display 235 to display the current feature values stored in the memory 240 in combination with the corresponding feature terse definitions. Optionally, an icon corresponding to the feature can be displayed in combination with each terse definition.

In operation, a user can provide instructions through either one or both of the one or more input devices 245 and the network 255. The user can provide a request to review or modify the values of one or more of the features of a job. In response to this request, the display manager 270 drives the display 235 to display the table and one or more terse textual language definitions of a feature in each table portion for that job. The feature value setting manager 250 reads the current feature values corresponding to the displayed terse definitions for that job. The display manager 270 drives the display 235 to display the current features values for the displayed terse definitions for that job.

The user reviews the current feature values for that job and can select a feature. Upon the user selecting one of the features, the feature value setting manager 250 provides data for modifying one or more current feature values corresponding to the selected feature. The display manager 270 drives the display 235 to display the data provided by the feature value setting manager 250. Next, a modified value for one or more of the values corresponding to the selected feature may be input by the user via one of the input devices 245 or the network 255. The feature value setting manager 250 stores the new current value for the selected feature in the memory 240. As a result, the data processing system 200 can perform a job on a defined set of data, based on the newly set current value for the selected feature.

It should be appreciated that one or more of the input/output port 210, the printer manager 220, the data processing circuit 230, the memory 240, the feature value setting manager 250, the communication manager 260 and the display manager 270 may be incorporated in one of the printer 225, the display 235 and the input devices 245, such as in a scanner, a digital copier, a facsimile machine or a multifunction device.

Figure 3:
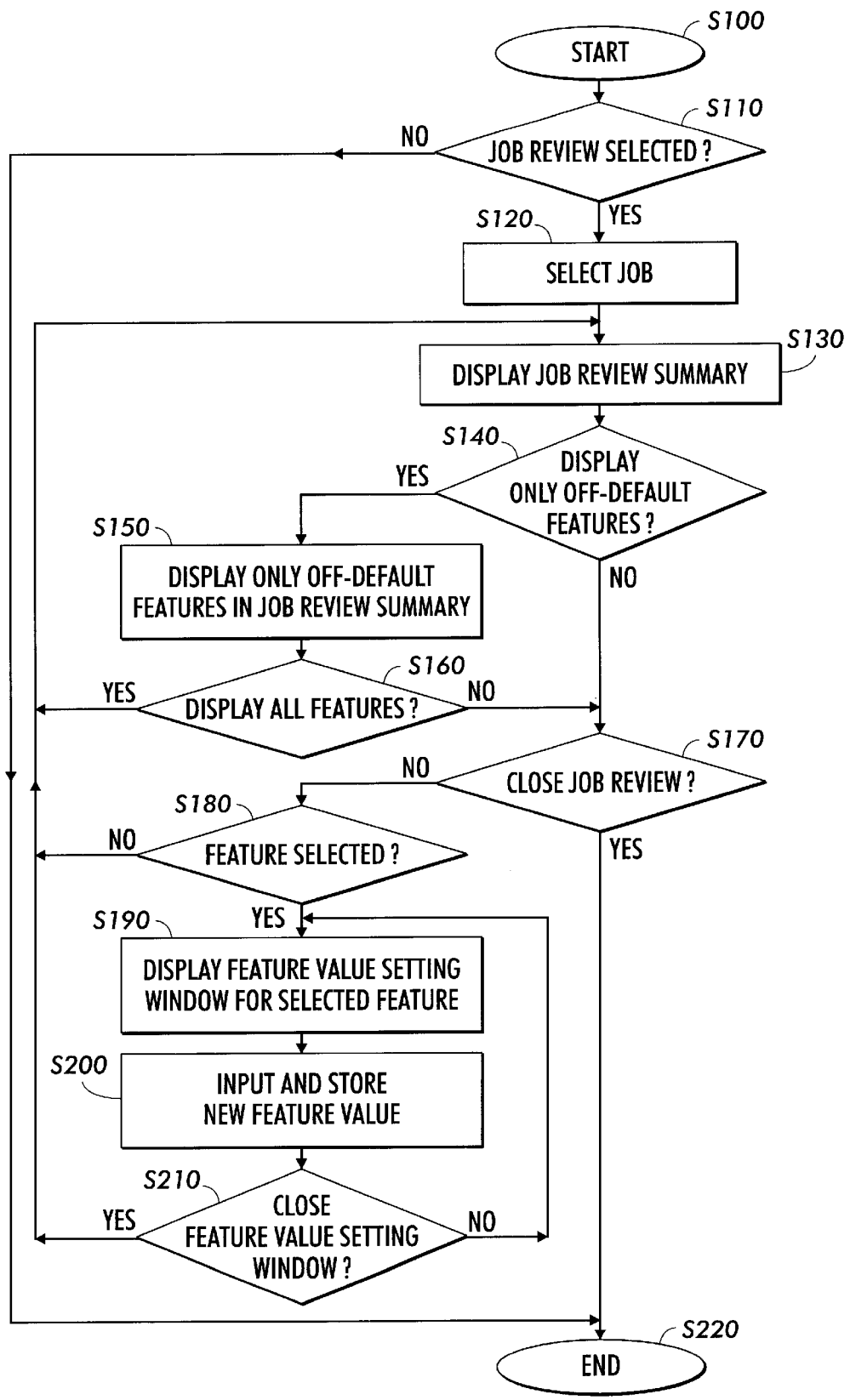
FIG. 3 is a flowchart outlining one exemplary embodiment of a data processing method according to this invention.

FIG. 3 is a flowchart outlining one exemplary embodiment of a data processing method according to this invention. Beginning in step S100, control continues to step S110, where a determination is made whether a job review operation is selected. If so, control continues to step S120. Otherwise, control jumps to step S220, where the process ends and other data processing operations are accessed or enabled.

In step S120, a job is selected. Next, in step S130, a displayed all-feature job review summary is displayed. The displayed all-feature job review summary is intended to display all the features of the selected job. The displayed job review summary includes a table of table portions. Each table portion includes one or more feature terse textual language definitions relating to a job feature. One or more current feature values are displayed in combination with each feature terse definition. Optionally, an icon corresponding to the feature is displayed in combination with each terse definition.

In various exemplary embodiments, the displayed job review summary also includes a button that, when selected, limits the displayed features to those that have an off-default feature value. Thus, in step S140, a determination is made whether only those features having off-default values are to be displayed. If so, control continues to step S150. Otherwise, control jumps to step S170.

In step S150, only the features having off-default values are displayed in the features review summary. That is, the displayed features review summary includes only those features for which at least one current feature value is different from the corresponding default value for that feature. Next, in step S160, a determination is made whether all of the features are to be displayed. If so, control jumps back to step S130. Otherwise, control continues to step S170.

In step S170, a determination is made whether the job review summary is to be closed. If so, control jumps to step S220. Otherwise, control continues to step S180. In step S180, a determination is made whether a feature has been selected. If so, control continues to step S190. Otherwise control jumps back to step S130. In step S190, a feature value setting window corresponding to the selected feature is displayed. Next, in step S200, one or more modified feature values are input and stored for the displayed feature. Then, in step S210, a determination is made whether the feature setting window is to be closed. If so, control jumps back to step S130. Otherwise, control continues to step S190.

FIG. 4 shows a first exemplary embodiment of a job feature review summary graphical user interface 400 displayable using any of the data processing systems and methods according to this invention. The job feature review summary graphical user interface 400 includes five table columns 410–450. Each of the table columns 410–450 comprises a header 460, one or more terse textual language feature definitions 470 and one or more current feature values 480 for each of the terse textual language feature definitions 470.

In the exemplary embodiment of the job feature review summary graphical user interface shown in FIG. 4, the terse definitions 470 are not selectable. However, in other exemplary embodiments of the job feature review summary graphical user interface 400, each of one or more of the terse definition 470 is selectable to access a feature value setting graphical user interface as shown, for example, in FIG. 9. This feature value graphical user interface allows the user to modify the current value of the features corresponding to the terse definition.

Each header 460 provides a common definition of the features that are represented in that corresponding table columns 410–450. Each terse textual language definition 470 is a concise definition of a feature. For example, the top feature of the basic feature table column 410 relates to a feature for setting the particular color mode for the selected job. Thus, this feature has a terse definition 470 of "color mode".

Each of the current feature values 480 gives the currently stored feature value for each settable value for the feature described by the corresponding terse definition 470. For example, the current feature value 480 of the "color mode" feature is "auto". In various exemplary embodiments, the current feature values 480 are located closer to the corresponding terse definition 470 than to any other terse definition 470.

In the exemplary job feature review summary graphical user interface 400 shown in FIG. 4, the terse definitions 470 are underlined and written in bold font, while the current feature values 480 are written in a normal font. Moreover, the font size used for writing the current feature values 480 is smaller than the font size used for writing the terse definitions 470.

FIG. 5 shows one exemplary embodiment of an expanded table portion of the first exemplary job feature review summary graphical user interface 400. As shown in FIG. 5, when the table column 440 is selected, the table column 440 overwrites the table column 450 to present additional detailed contextual features. The width of table column 440 is enlarged so that a user can review either or both of further feature values or enhanced definitions for the features.

FIG. 6 shows a second exemplary embodiment of the job feature review summary graphical user interface 600 according to this invention. The job feature review summary graphical user interface 600 includes five table columns 610–650. Each of the table columns 610–650 comprises a header 660, one or more terse textual language feature definitions 670 and one or more current feature values 680. Each header 660 provides a common definition of the features that are represented in the corresponding table columns 610–650. Each terse textual language definition 670 is a concise definition of a feature. For example, as in the first exemplary embodiment, the job review summary graphical user interface shown in FIG. 4, the top feature of the table column 610 relates to a feature whose terse definition 670 is "color mode".

In the exemplary embodiment of the job feature review summary graphical user interface 600 shown in FIG. 6, the terse definitions 670 are not selectable. However, in other exemplary embodiments of the job feature review summary graphical user interface 600, each of one or more of the terse definition 670 is selectable to access a feature value setting graphical user interface as shown, for example, in FIG. 9. This feature value graphical user interface allows the user to modify the current value of the features corresponding to the terse definition and to return to the job review summary graphical user interface.

Each of the current feature values 680 give the currently stored feature value for each settable value for the feature described by the corresponding terse definition 670. In various exemplary embodiments of the job feature review summary graphical user interface 600, the current feature values 680 are located closer to the corresponding terse definition 670 than to any other terse definition 670.

In the exemplary job feature review summary graphical user interface 600 shown in FIG. 6 also, the terse definitions 670 are underlined and written in a bold font, while the current feature values 680 are written in a normal font.

Moreover, the font size used for writing the current feature values 680 is smaller than the font size used for writing the terse definitions 670.

Figure 7:
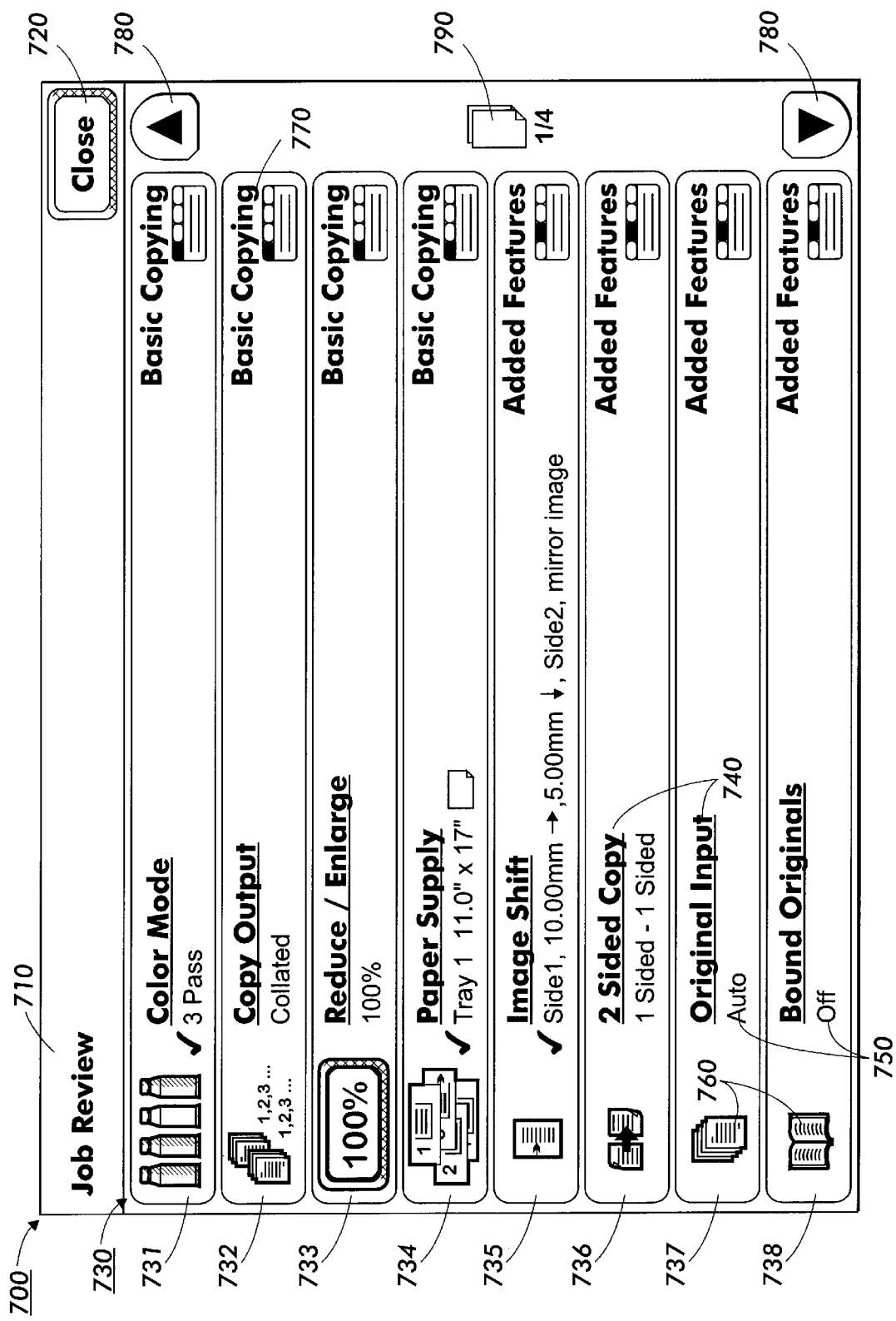
FIG. 7 shows a third exemplary embodiment of the job feature review summary graphical user interface according to this invention.

FIG. 7 shows a third exemplary embodiment of the job feature review summary graphical user interface 700 according to this invention. The job feature review summary graphical user interface 700 includes a title zone 710, a close button 720, a plurality of table entries 730, such as table lines 731–738, scroll buttons 780 and a page identifier 790.

The job title zone 710 displays an indication that a job review is being displayed and can display the name of the job. The close button 720 allows the user to close the job review summary graphical user interface 700. Each one of the table entries 730–738 includes a terse textual language definition 740 of the corresponding feature, one or more current feature values 750 for the corresponding feature, an icon 760 and a type of feature identifier 770.

Each terse textual language definition 740 is a concise definition. For example, the table entry 731 relates to a feature whose terse definition 740 is "color mode". This feature entry is used to define the type of color processing that will be used when the job will be performed. The table entry 732 relates to a feature whose terse definition is "copy output". This feature is used to define how the output documents will be organized when the job will be performed. The table entry 733 relates to a feature whose terse definition is "reduce/enlarge". This feature is used to define the reduction or enlargement ratios for reducing or enlarging an original document when forming an output document. It should be appreciated, as shown in FIG. 7, that the horizontal reduction/enlargement ratio may be different from the vertical reduction/enlargement ratio.

In the exemplary embodiment of the job feature review summary graphical user interface 700 shown in FIG. 7, each of the entries 730–738 is selectable. Selecting an entry gives the user access to a feature value setting graphical user interface such as, for example, the reduce/enlarge feature value setting graphical user interface shown in FIG. 9. Each of the current feature values 750 indicates the currently stored feature value for each of the settable values for the feature described by the corresponding terse definition 740. In various exemplary embodiments of the job feature review summary graphical user interface 700, if at least one table entry 730 contains terse definitions 740 for a plurality of features, each current feature value 750 in this table entry 730 is positioned closer to the corresponding terse definition 740 than to any other terse definition 740. In the exemplary embodiment of the job feature review summary graphical user interface 700 shown in FIG. 7, the current feature value 750 of the color mode feature shown in the table entry 731 is "3 pass". The current feature value 750 of the copy output feature shown in the table entry 732 is "collated".

In the exemplary job feature review summary graphical user interface shown in FIG. 7, the terse definitions 740 are underlined and written in a bold font, while the current feature values 750 are written in a normal font. Moreover, the font size used for writing the current feature values 750 is smaller than the font size used for writing the terse definitions 740.

The icons 760 are graphical representations of the features terse definitions. The type of feature identifiers 770 indicates the class of feature, for example the basic copying class or added features class that the feature in the corresponding table entry 730 belongs to. The scroll buttons 780 allow a user to successively view all the feature table entries 730, either by scrolling upward, by using the up scroll button 780, or by scrolling downward, by using the down scroll button 780. The page identifier 790 represents the subset of displayed table entries 730 that could be displayed by using the scroll buttons 780. In the exemplary embodiment shown in FIG. 7, the table entries 730 are located on four pages where each page corresponds to a subset of eight table entries 730. If the down scroll button 780 is selected, the next page is displayed. If the up scroll button 780 is selected, the previous page is displayed.

Figure 8:
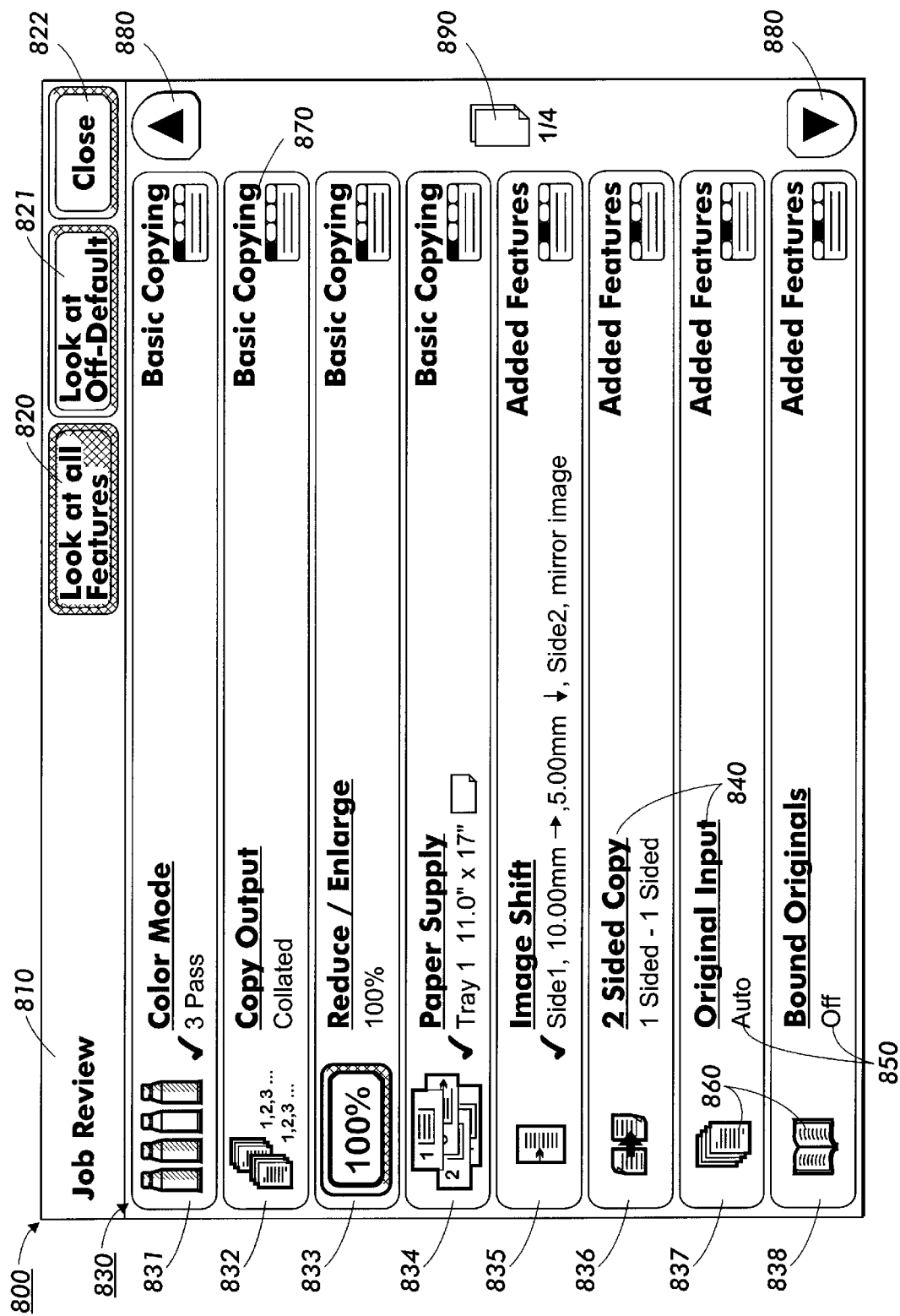
FIG. 8 shows a fourth exemplary embodiment of the job feature review summary graphical user interface according to this invention.

FIG. 8 shows a fourth exemplary embodiment of the job feature review summary graphical user interface 800 according to this invention. The job feature review summary graphical user interface 800 includes a title zone 810, a display all features button 820, a display only off-default features button 821, a close button 822, a plurality of table entries 830, such as the table lines 831–838, scroll buttons 880 and a page identifier 890.

The job title zone 810 displays an indication that a job review is being displayed and can display the name of the job. The display all features button 820 indicates that all the features of the job may be viewed directly or through the use of the scroll buttons 880. The display only off-default features button 821 allows the user to require displaying only the features for which at least one current feature value is different from the corresponding default value.

The close button 822 allows the user to close the job review summary graphical user interface. Each one of the table entries 831–838 includes a terse textual language definition 840 of a corresponding feature, one or more current feature values 850 for the corresponding feature, an icon 860 and a type of feature identifier 870. Each terse textual language definition 840 is a concise definition of the corresponding feature. Each of the current feature values 850 indicates the currently stored feature value for each of the settable values for the feature briefly described by the corresponding terse definition 840.

In the exemplary embodiment of the job feature review summary graphical user interface 800 shown in FIG. 8, each of the entries 830–838 is selectable. Selecting an entry gives the user access to a feature value setting graphical user interface such as, for example, the reduce/enlarge feature value setting graphical user interface shown in FIG. 9.

Figure 9:
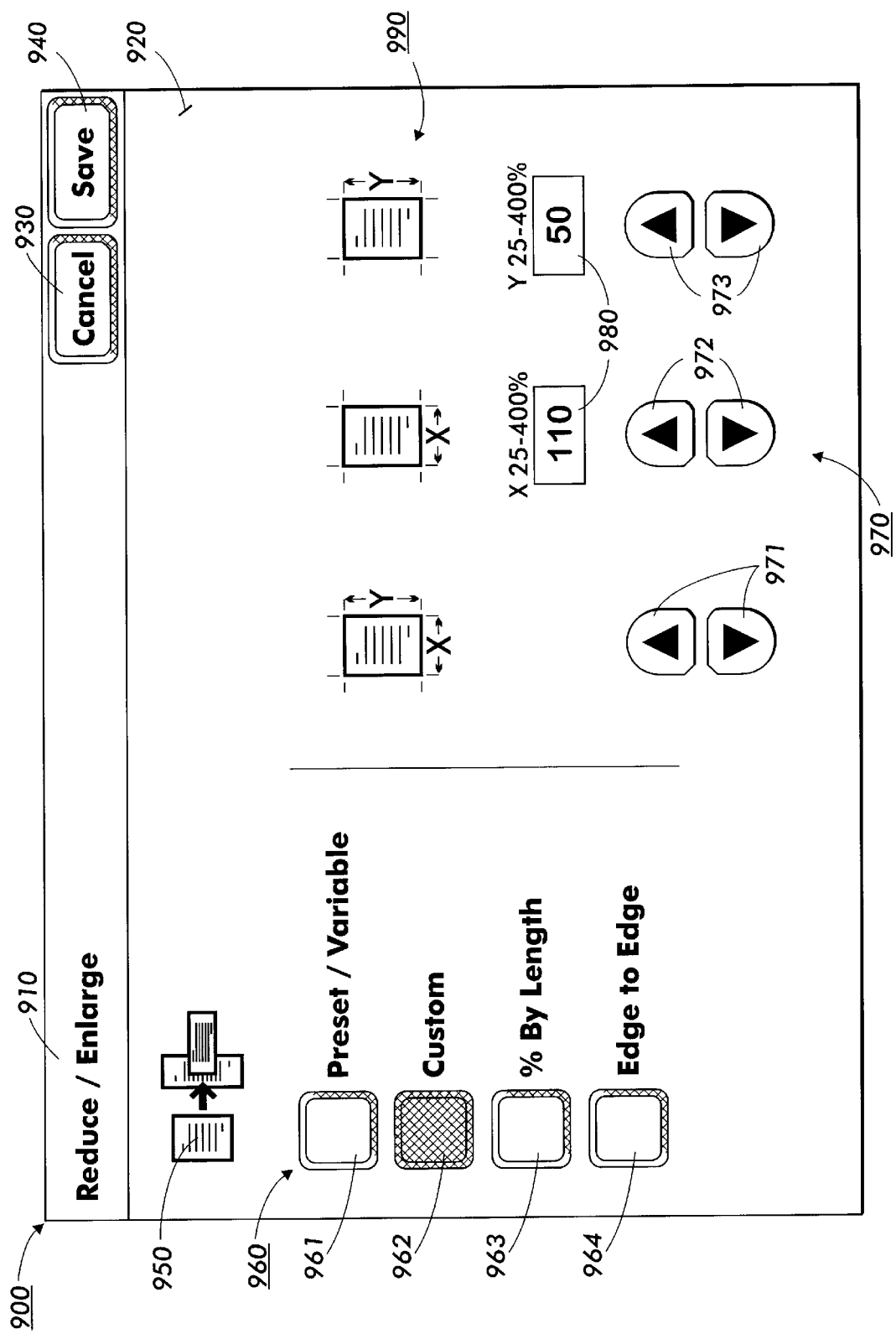
FIG. 9 shows an embodiment of one exemplary feature value setting graphical user interface according to this invention.

FIG. 9 shows one exemplary embodiment of a reduce/enlarge feature value setting graphical user interface 900 according to this invention. The reduce/enlarge feature value setting graphical user interface 900 is displayed when a user selects the reduce/enlarge table entry 733 or 833 or the terse definition 471–671. It should be appreciated that, upon the user selecting one of the other selectable table entries 730 or 830, a feature value setting graphical user interface 900 that is appropriate for that feature will be displayed.

The reduce/enlarge feature value setting graphical user interface 900 includes a terse definition zone 910, a feature value setting window 920, a cancel button 930 and a save button 940. The terse definition zone 910 displays the terse definition corresponding to the selected feature, i.e., reduce/enlarge in case of the table entries 733 or 833. The cancel button 930 allows the user to return to the job review summary that was displayed before the feature value setting graphical user interface 900 was accessed, without saving any modification of the corresponding current feature values.

The save button 940 allows the user to save the changes made to the corresponding current feature values and to return to the job review summary which was displayed before the feature value setting graphical user interface 900.

The setting window 920 includes an icon 950 corresponding to the selected feature. The setting window 920 also includes graphical user interface widgets that are appropriate for the selected feature. Thus, as shown in FIG. 9, when the reduce/enlarge feature is selected, the feature value setting graphical user interface 900 includes a setting mode portion 960, a value adjustment portion 970, a setting value portion 980 and a definition portion 990. The setting mode portion 960 of the job feature review summary graphical user interface 900 includes buttons that allow the user to select a mode for modifying the feature values. In the exemplary embodiment shown in FIG. 9, the setting mode portion 960 of the job feature review summary graphical user interface 900 includes a preset/variable button 961, a custom button 962, a percent by length button 963 and an edge button 964. However, in other embodiments of feature value setting graphical user interface for other features than reduce/enlarge, other portions and/or other buttons may be displayed for setting feature values corresponding to the selected feature.

The preset/variable button 961 selects the preset of potential feature values, such as 25%, 50%, 75%, 100%, 125%, . . . 400%, for example. The custom button 962 allows the selection of any percentage for each of the horizontal and vertical reduction/enlargement ratios. The percent by length button 963 allows the horizontal ratio to be determined automatically based on the selected vertical ratio. The edge to edge button 964 allows the horizontal ratio to correspond to the ratios from the horizontal size of the original document to the horizontal size of the paper on which the original document is copied and the vertical ratio to correspond to the ratios from the vertical size of the original document to the vertical size of the paper on which the original document is copied.

In the example shown in FIG. 9, the custom setting mode button is shown in reverse, indicating that the custom setting mode is selected. The value adjustment portion 970 of the job feature review summary graphical user interface 900 correspond to the selected setting mode and includes scroll buttons 971–973. The left buttons 971 are used to simultaneously adjust the horizontal and vertical reduction/enlargement ratios so that they have the same value. The central buttons 972 are used to adjust the horizontal X reduction/enlargement ratio. The buttons 973 are used to adjust the vertical Y reduction/enlargement ratio.

The setting windows 980 of the job feature review summary graphical user interface 900 display the current values of the horizontal and vertical reduction/enlargement ratios. The definition icons 990 of the job feature review summary graphical user interface 900 give a visual explanation of which size of a sheet of paper is the vertical "Y" size and which size is the horizontal "X" size.

As stated above, each specific feature may have a specific feature value setting graphical user interface that correspond to the settable feature values. For example, the feature corresponding to the feature entries 738 and 838 that is defined as "bound original" can only be set to one of the potential feature values "on" and "off". The feature value setting graphical user interface that corresponds to that feature may display only one graphical user interface widget to allow the selection of the feature value.

Figure 10:
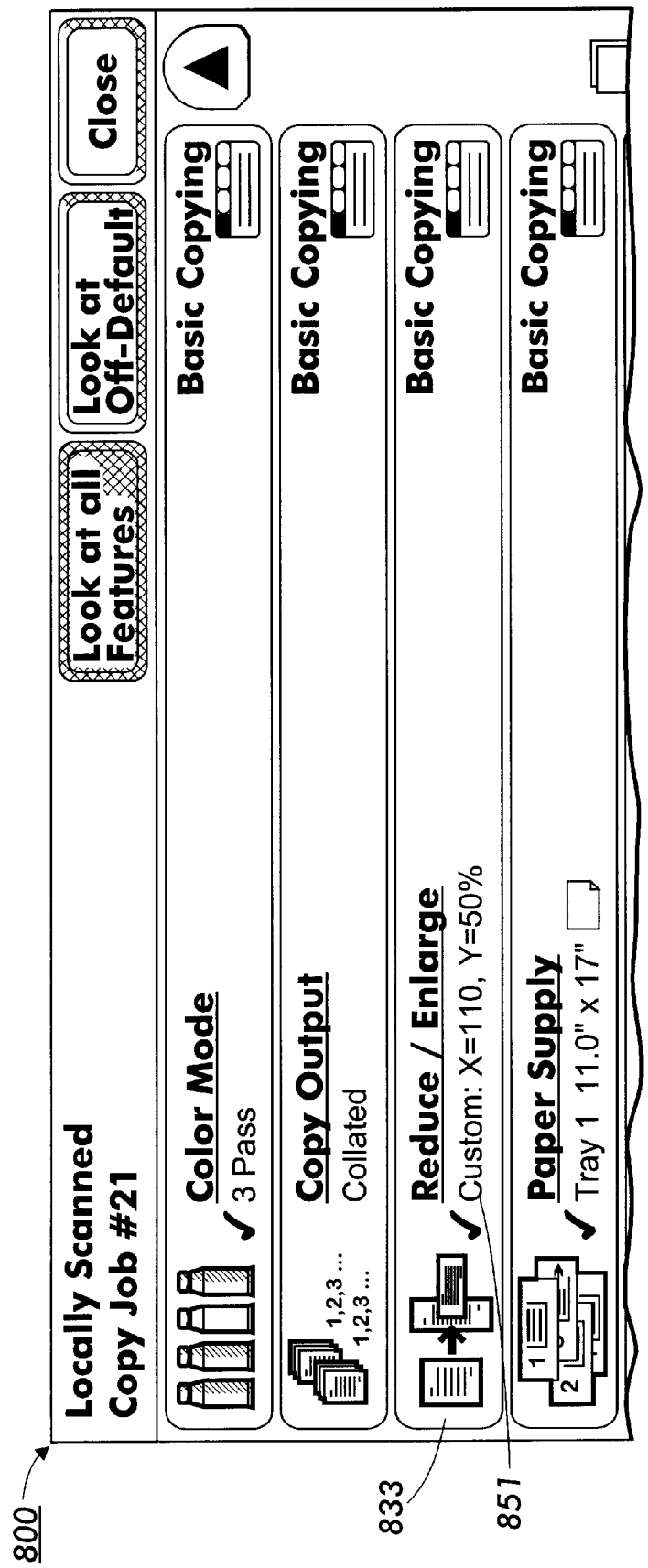
FIG. 10 partially shows the fourth exemplary embodiment of the job feature review summary graphical user interface after the value set for the reduced/enlarged feature is changed.

FIG. 10 shows a portion of the fourth exemplary embodiment of the job feature review summary graphical user interface 800 after the value set for the reduced/enlarged feature is changed. In the job exemplary embodiment of the feature review summary graphical user interface 800, the current feature values 851 of the reduce/enlarge feature 833 have been changed compared to the corresponding current feature values shown in FIG. 8.

It should be appreciated that the reduce/enlargement current feature values have been changed by using only three button presses. This number should be compared to the longer normal programming route that uses five or six button presses. Moreover, the systems and methods of this invention provide a more direct straight programming route.

Figure 11:
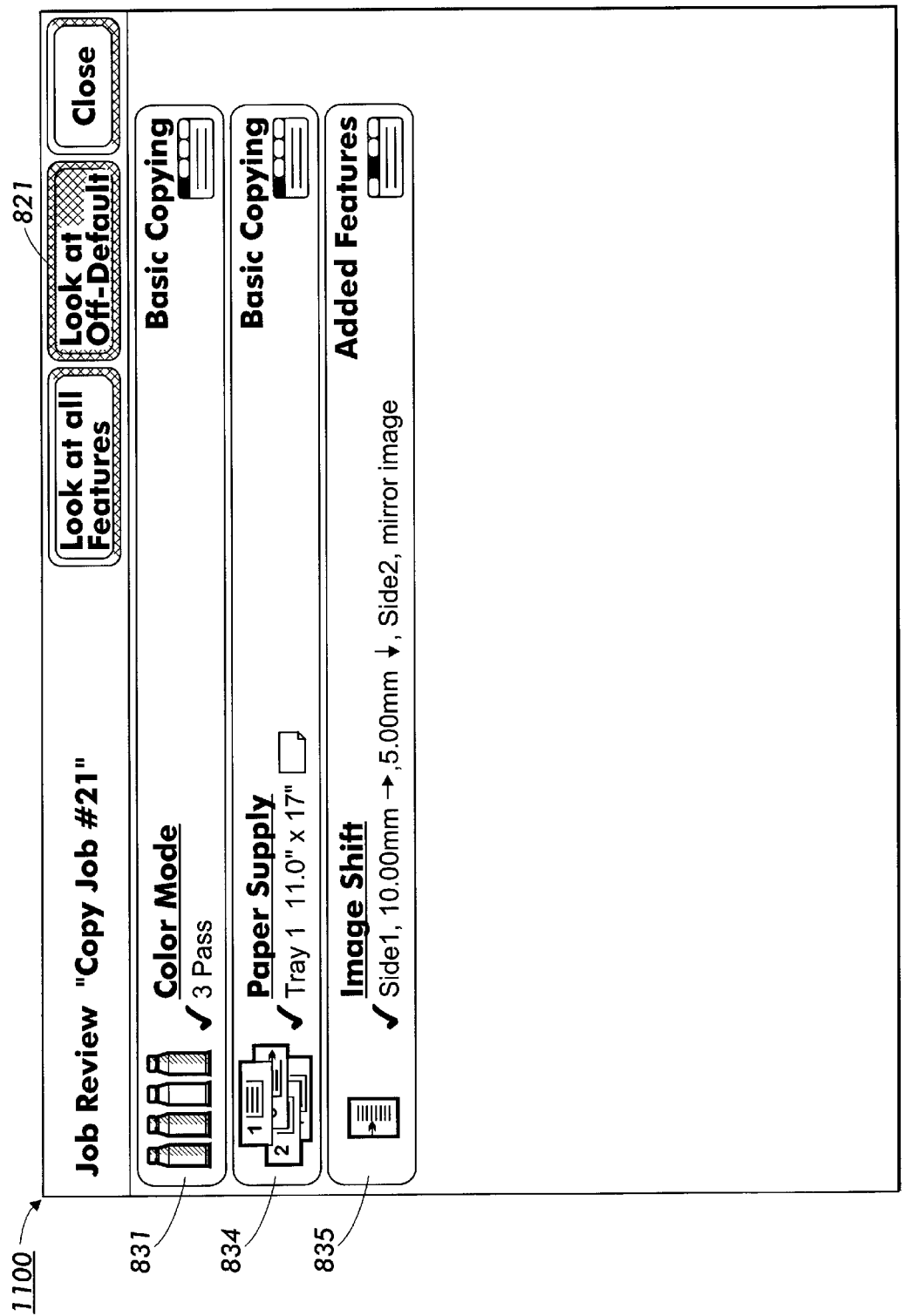
FIG. 11 shows the fourth exemplary embodiment of the feature review summary graphical user interface after the "off-default" filter button is selected.

FIG. 11 shows an exemplary embodiment of the fourth exemplary embodiment of the feature review summary graphical user interface 1100 after the "off-default" filter button 821 is selected. As shown in FIG. 11, after the "off-default" filter button 821 is selected, the feature review summary graphical user interface 800 displays only the table entries 831, 834 and 835 that have at least one current feature value that is different from the corresponding default value. In the exemplary embodiment of the feature review summary graphical user interface 800 shown in FIG. 11, the off-default features are the color mode feature displayed in the table entry 831, the paper supply feature displayed in the table entry 834 and the image shift feature displayed in the table entry 835.

If one of the table entries 931, 834 or 835 is selected, a corresponding feature value setting graphic user interface is displayed so that the user can modify each settable feature value for the selected feature. Thus, the user can select and modify or correct features values in the job review summary. This provides a redundant method of accessing the job feature set which is fast, productive and direct.

Figure 12:
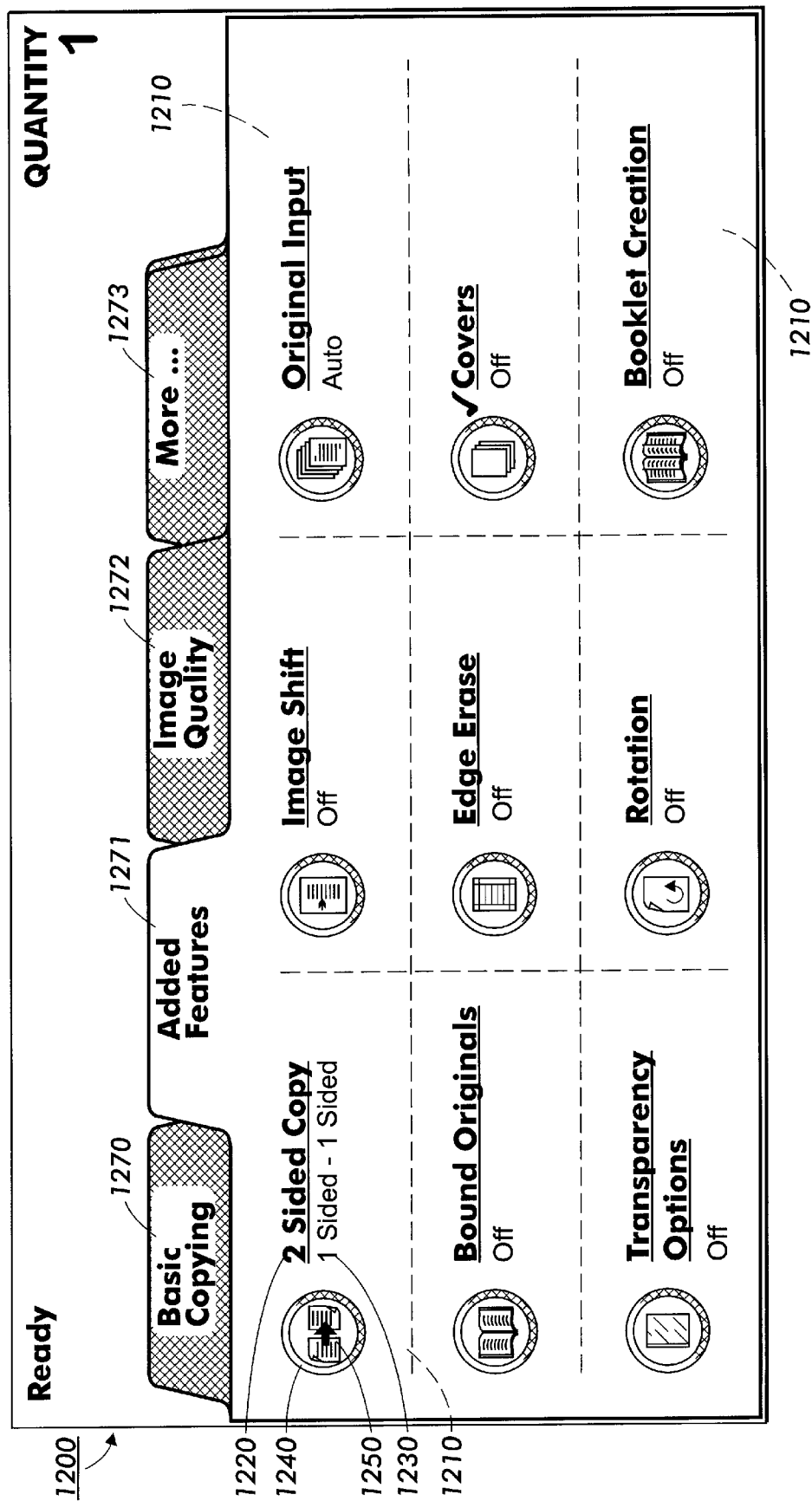
FIG. 12 shows a fifth exemplary embodiment of a feature review summary graphical user interface according to this invention.

FIG. 12 shows a fifth exemplary embodiment of a feature review summary graphical user interface 1200 displayable using any of the data processing systems and methods according to this invention. The job feature review summary graphical user interface 1200 includes nine table portions 1210 in three rows and three columns. Each table portion 1210 corresponds to one feature and comprises a terse textual language feature definition 1220, one or more current feature values 1230 and a button 1240 that displays an icon 1250 corresponding to the feature.

In the exemplary embodiment of the job feature review summary graphical ser interface shown in FIG. 12, the buttons 1240 are selectable to select the corresponding feature and to access a feature value setting graphical user interface as shown, for example, in FIG. 9. This feature value graphical user interface allows the user to modify the current value of the features corresponding to the terse definition.

Four headers 1270–1273 provide a common definition of the features that may be accessed together by selecting that header. For example, the header 1270 is "Basic Copying" and corresponds to basic copying features, like, the color mode, the output mode, the reduction/enlargement feature, the selected paper supply. The header 1271, which is the selected header in the exemplary embodiment shown in FIG. 12, is "Added Features" and relates to additional features as compared to the "Basic Copying" features. A user may select any one of the headers 1270–1273.

Each terse textual language definition 1220 is a concise definition of a feature. Each of the current feature values 1230 gives the currently stored feature value for each settable value for the feature described by the corresponding terse definition 1220. For example, the current feature value 1230 of the "2 Sided Copy" feature is "1 Sided—1 Sided".

Figure 13:
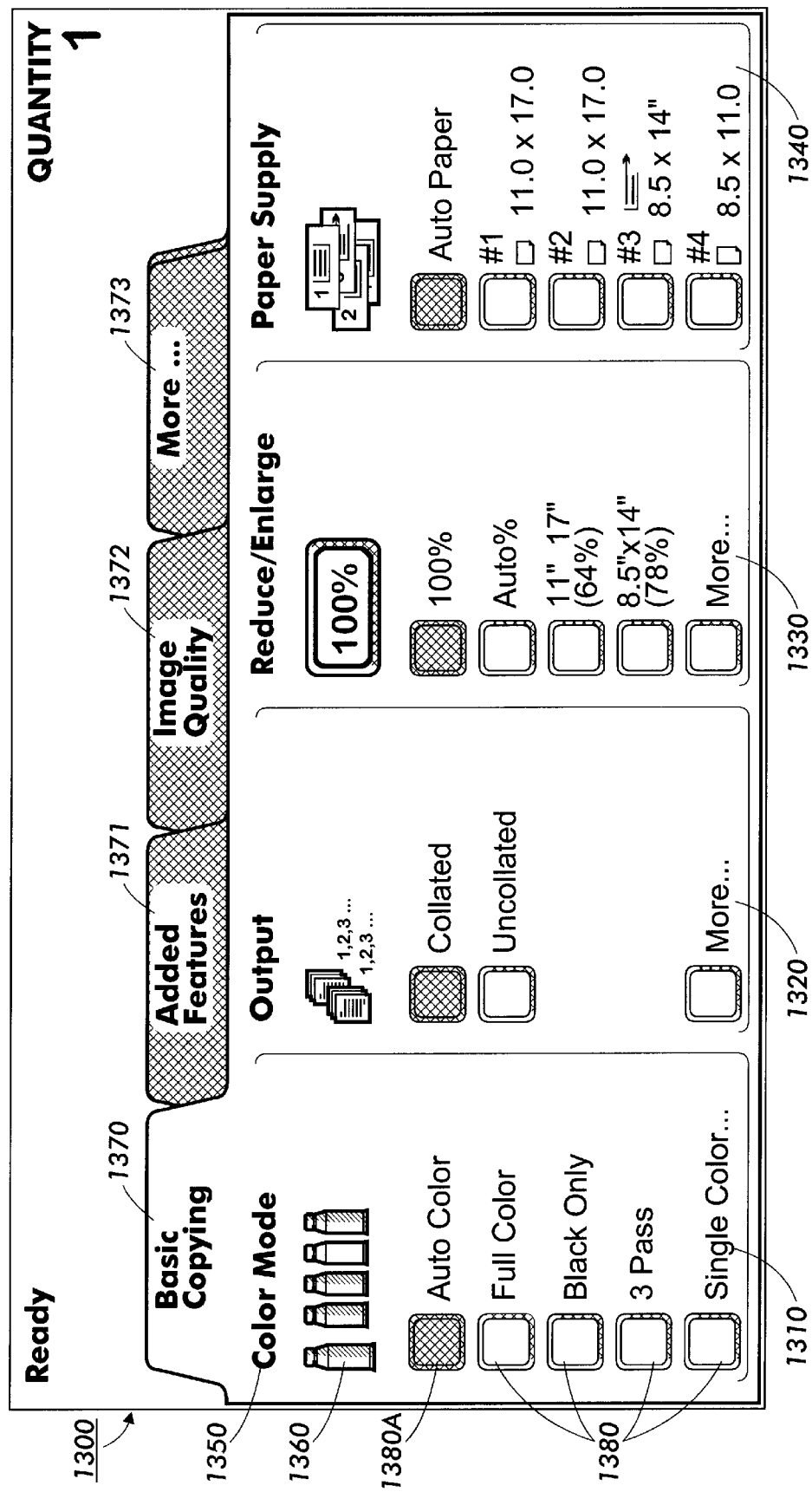
FIG. 13 shows a sixth exemplary embodiment of a job feature review summary graphical user interface according to this invention.

FIG. 13 shows a sixth exemplary embodiment of the job feature review summary graphical user interface 1300 displayable using any of the data processing systems and methods according to this invention. The job feature review summary graphical user interface 1300 includes four table columns 1310–1340. Each of the table columns 1310–1340 comprises a terse textual language feature definition 1350, an icon 1360 corresponding to the terse definition 1350 and two or more potential feature values 1380 for the feature corresponding to the terse textual language feature definitions 1350. The potential feature values 1380 include the current feature value 1380A for that feature. The current feature value 1380A gives the currently stored feature value for the feature described by the corresponding terse definition 1350. For example, the current feature value 1380A of the "color mode" feature is "auto". In FIG. 13, the current feature values 1380A are identified by a depressed button while the other potential feature values 1380 are identified by non-depressed buttons.

In the exemplary embodiment of the job feature review summary graphical user interface shown in FIG. 13, the features values 1380 of the terse definitions 1350 are selectable by selecting the corresponding button 1380. The job feature review summary graphical user interface 1300 allows the user to modify the current feature value 1380A of the features corresponding to the terse definitions 1350 without using any other graphical user interface.

A header 1370 provides a common definition "Basic Copying" of the features that are represented in the table columns 1310–1340. Three other headers 1371–1373 provide a common definition of features that may be accessed together. A user may select any one of the headers 1370–1373. Each terse textual language definition 1350 is a concise definition of a feature. For example, the table column 1310 relates to a feature for setting the particular color mode for the selected job. Thus, this feature has a terse definition 1350 of "color mode".

Each of the embodiment of the feature review summary graphical user interface according to this invention may be used to save one or more job programs and apply any saved job program to subsequent jobs. In exemplary embodiments of this invention, at least the off-default current feature values are saved with an identifier of the corresponding job. This job may be identified later and the saved features values may then be allocated to another job. These steps may help a user to set the current values for the other job.

As shown in FIGS. 1 and 2, the data processing system may be implemented on a programmed general purpose computer. However, the data processing system can also be implemented on a special purpose computer, a programmed microprocessor or microcontroller and peripheral integrated circuit elements, an ASIC or other integrated circuit, a digital signal processor, a hardwired electronic or logic circuit such as a discrete elements circuit, a programmable logic device such as a PLD, PLA, FPGA or PAL, or the like. In general, any device capable of implementing a finite state machine that is in turn capable of implementing one or more of the flowcharts shown in FIG. 3, can be used to implement the data processing system.

Moreover, the data processing system can be implemented as software executing on a programmed general purpose computer, a special purpose computer, a microprocessor or the like. In this case, the data processing system can be implemented as a routine embedded in a printer driver, a scanner driver, a copier driver, as a resource residing on a server, or the like. The data processing system can also be implemented by physically incorporating it into a software and/or hardware system, such as the hardware and software systems of a printer, a scanner or a digital photocopier.

It should be understood that each of the circuits shown in FIGS. 1 and 2 can be implemented as portions of a suitably programmed general purpose computer. Alternatively, each of the circuits shown in FIGS. 1 and 2 can be implemented as physically distinct hardware circuits within an ASIC or other integrated circuit, a digital signal processor, a hardwired electronic or logic circuit such as a discrete elements circuit, a programmable logic device such as a PLD, PLA, FPGA or PAL, or using discrete circuit elements. The particular form each of the circuits shown in FIGS. 1 and 2 will take is a design choice and will be obvious and predictable to those skilled in the art.

The scope of the invention is not limited to job review summaries but encompasses any graphical user interface, including graphical user interfaces for displaying dialog feature default settings, machine error log, diagnostic settings, job list, features list, default setting list, preprogrammed job list, custom features/jobs, tools listing, help/information custom listings, fault listings, jam clearance level listings, paper supply lists, customer replaceable items, lists of operators and their training levels, fax lists, attached server lists.

While the invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for displaying current feature values of a plurality of features associated with a current image processing job, the method comprising:

collecting current feature values, displaying a table defining a plurality of table portions, for at least one feature of the plurality of features, displaying at least one terse textual definition in one of the plurality of table portions and at least one current feature value relating to the feature in the one of the plurality of table portions, wherein only those features of the plurality of features with off-default values are displayed and each such feature having an off-default value is operable to be selected from the table to change a current value of that feature having an off-default value for the current image processing job.

2. The method of claim 1, further comprising, if a table portion is selected, expanding at least one size of the table portion to display additional data in the expanded table portion.

3. The method of claim 2, wherein the expanded table portion overwrites at least one other table portion.

4. The method of claim 1, wherein each feature terse definition is given in a specific table portion.

5. The method of claim 1, wherein the table portions are table lines.

6. The method of claim 5, further comprising displaying a subset of the features and displaying scroll buttons that allow changing the displayed features.

7. The method of claim 1, further comprising receiving a selection of a feature and displaying a setting window for the selected feature.

8. The method of claim 7, further comprising modifying current feature values and storing the modified current feature values.

9. The method of claim 1, further comprising displaying a specific icon with each terse definition.

10. The method of claim 1, further comprising displaying a plurality of potential feature values relating to a feature in one of the plurality of table portions.

11. The method of claim 10, further comprising receiving a selection of at least one potential feature value.

12. The method of claim 11, further comprising storing the at least one selected potential feature values as new current feature values.

13. The method of claim 12, further comprising, for each selected potential feature value, displaying the selected potential feature value as a current feature value with the corresponding feature textual language terse definition.

14. The method of claim 1, further comprising saving at least one current feature value with an identifier of a first job.

15. The method of claim 14, further comprising selecting the first job and allocating the at least one saved current feature value of the first job to a second job.

* * * * *